(12) United States Patent
Ran et al.

(10) Patent No.: US 7,954,419 B2
(45) Date of Patent: Jun. 7, 2011

(54) BELLY SYSTEM FOR A VEHICLE

(75) Inventors: Eylam Ran, Kiryat Tivon (IL); Nir Kahn, Nahariya (IL)

(73) Assignee: Plasan Sasa Ltd., M.P. Marom Hagall (IL)

( * ) Notice: Subject to any disclaimer, the term of this patent is extended or adjusted under 35 U.S.C. 154(b) by 117 days.

(21) Appl. No.: 12/472,797

(22) Filed: May 27, 2009

(65) Prior Publication Data

US 2009/0293712 A1    Dec. 3, 2009

(30) Foreign Application Priority Data

May 29, 2008    (IL) ............................................ 191807
May 21, 2009    (IL) ............................................ 198881

(51) Int. Cl.
  *F41H 7/02*        (2006.01)
(52) U.S. Cl. ...................... 89/36.08; 89/929; 296/187.08
(58) Field of Classification Search ................. 89/36.07, 89/36.08, 36.09; 296/187.07, 187.08, 190.03; 293/132

See application file for complete search history.

(56) References Cited

U.S. PATENT DOCUMENTS

| | | | | |
|---|---|---|---|---|
| 4,593,870 A | * | 6/1986 | Cronkhite et al. | ......... 244/117 R |
| 5,069,318 A | * | 12/1991 | Kulesha et al. | ................ 188/377 |
| 5,905,225 A | * | 5/1999 | Joynt | ........................... 89/36.02 |
| 6,658,984 B2 | * | 12/2003 | Zonak | ...................... 296/193.07 |
| 7,192,067 B2 | * | 3/2007 | Hansen | .......................... 293/133 |
| 7,255,034 B2 | * | 8/2007 | Strassgurtl et al. | ...... 296/193.07 |
| 7,735,779 B2 | * | 6/2010 | Griess et al. | ................... 244/119 |
| 7,758,095 B2 | * | 7/2010 | Elhanany | ......................... 296/63 |
| 7,856,762 B2 | * | 12/2010 | Deisenroth et al. | ............ 52/79.1 |
| 2007/0186762 A1 | * | 8/2007 | Dehart et al. | ................ 89/36.09 |
| 2008/0173167 A1 | | 7/2008 | Mills et al. | |

FOREIGN PATENT DOCUMENTS

AU        A-42221/96        *  4/1997

* cited by examiner

Primary Examiner — John Q Nguyen
Assistant Examiner — Joshua Freeman
(74) Attorney, Agent, or Firm — Oliff & Berridge, PLC

(57) ABSTRACT

According to one aspect of the present invention there is provided a reinforced cabin for a vehicle adapted to protect the interior of the cabin against a threat of a certain maximal force. The vehicle cabin is defined by at least a vehicle belly and side walls extending upwardly therefrom. The cabin comprises a vehicle floor extending between the side walls and spaced a distance L1 from the vehicle belly; at least one passenger seat comprising a seat portion parallel to the floor, and positioned such that there extends a space of a distance L2 between the seat portion and the vehicle floor; and at least one resistance member having a proximal end fixedly attached to the belly and a distal end adjacent the vehicle floor, and located at least partially underneath the seat portion. The belly is adapted to undergo upward deformation under the certain maximal force towards the floor of a distance L3. The vehicle floor is formed with at least one opening adapted to slidingly receive therethrough the resistance member in order to allow the distal end thereof to assume a position elevated a distance equal to the distance L3 above the vehicle floor. The arrangement is such that $L2 \geq L3$, $L1 \geq L3$ and $L3 < L4$, wherein L4 is the maximal upward deformation which the belly would undergo towards the floor under the maximal force, in the absence of the at least one resistance member.

13 Claims, 3 Drawing Sheets

BELLY SYSTEM FOR A VEHICLE

FIELD OF THE INVENTION

This invention relates to reinforced vehicle cabins, in particular, cabins comprising a belly and resistance members adapted to facilitate resistance of the belly to deformation.

BACKGROUND OF THE INVENTION

Armored vehicles, and in particular military vehicles, are usually designed so as to protect the passengers located within a cabin of the vehicle from threats, for example, bullets, rockets, explosive charges etc. One such threat is an explosive charge adapted to explode under the belly of the vehicle, thereby endangering the passengers within the cabin.

In order to secure the passengers within the cabin, a variety of solutions have been contemplated including the armored design of the belly, a more massive design of the belly and reinforcement of the belly of the vehicle by reinforcing systems, for example, an arrangement of reinforcing ribs.

The latter arrangement is adapted to reduce deformation of the belly under the force of explosion of an explosive charge by increasing the structural integrity thereof.

It has also been contemplated to design a vehicle in which the belly of the vehicle is separated from the floor of the vehicle on which passengers are positioned, whereby deformation of the belly does not effect the structural integrity of the vehicle floor.

SUMMARY OF THE INVENTION

According to one aspect of the present invention there is provided a reinforced cabin for a vehicle adapted to protect the interior of said cabin against a threat of a certain maximal force, said vehicle cabin being defined by at least a vehicle belly and side walls extending upwardly therefrom, and comprising:
- a vehicle floor extending between said side walls and spaced a distance L1 from the vehicle belly;
- at least one passenger seat comprising a seat portion parallel to the floor, and positioned such that there extends a space of a distance L2 between said seat portion and said vehicle floor;
- at least one resistance member having a proximal end fixedly attached to said belly and a distal end adjacent said vehicle floor, and located at least partially underneath said seat portion;
- said belly being adapted to undergo, under said certain maximal force, when applied, a maximal upward deformation towards said floor of a distance L3, and the vehicle floor is formed with at least one opening adapted to slidingly receive therethrough said resistance member in order to allow the distal end thereof to assume a position elevated a distance equal to the distance L3 above said vehicle floor, the arrangement being such that L2≧L3, L1≧L3 and L3<L4, wherein L4 is the maximal upward deformation which said belly would undergo towards said floor under said maximal force, in the absence of said at least one resistance member.

It should be understood that the term 'maximal deformation' refers to a predetermined design parameter of the vehicle which depends on an anticipated threat against which the vehicle is to be protected, the threat being defined for the purpose of the design of the vehicle. In other words, just as an armor panel is designed to withstand the impact of a predetermined threat, so is the reinforced cabin adapted to undergo 'maximal deformation' under the effect of a maximal force of a predetermined threat against which the cabin is reinforced.

According to one design embodiment, the resistance member may be in the form of a pillar, extending upwardly between the belly and the vehicle floor. According to another design embodiment, the resistance member may be in the form of a beam having an axial extension between the belly and the vehicle floor and a longitudinal extension in a direction perpendicular to the axial direction.

The cabin may comprise one or more seats arranged in one or more rows. According to one example, the row(s) may extend width-wise, i.e. along the width of the cabin defined between its sidewalls such that passengers seated on the seats are facing either the front of the vehicle or the rear of the vehicle. In this case, the longitudinal extension of the resistance member(s) may be width-wise, parallel to the row(s) of seats.

According to another example, the row(s) may extend length-wise, i.e. from a front end to a rear end of the cabin along a direction parallel to the side walls of the cabin such that the passengers seated on the seats are facing one of the side walls. In this case, the longitudinal extension of the resistance member(s) may be length-wise, parallel to the rows of the seats.

In other words, the arrangement is such that said at least one resistance members extends in a longitudinal direction which is generally transverse to the designed line of sight of a passenger seated on the seat.

The belly of the vehicle may have various shapes in its cross-section taken along a plane perpendicular to both the side walls and the vehicle floor, for example, straight, trapeze, V shaped etc. For each of the shapes, in case the resistance member is in the form of a beam as mentioned above, and in case the beams are disposed width-wise, the shape of the beam may correspond to the shape of the belly of the vehicle. However, the shape of the beam does not have to follow the exact cross-sectional shape of the belly. For example, in case the belly has a V shape cross-section as mentioned above, the beam does not have to be of a triangular shape and may also be of a trapeze shape.

The number of resistance members, the weight and dimensions thereof are among the factors which determine the value of the maximal deformation L3. Thus, increasing the number of resistance members, the dimensions thereof, and/or making them out of a heavier material, will facilitate in reducing the value of the maximal deformation L3.

According to one example, the seat portion of the at least one seat may be spaced from the vehicle floor by being positioned on a support member attached to the bottom surface of the seat portion. In this case, the distance L2 is determined by the vertical dimension of the support member. According to another example, the seat may be a suspended seat, i.e. the seat portion may be suspended above the vehicle floor using a suspension mechanism. In this case, the distance L2 is determined by the suspension mechanism.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
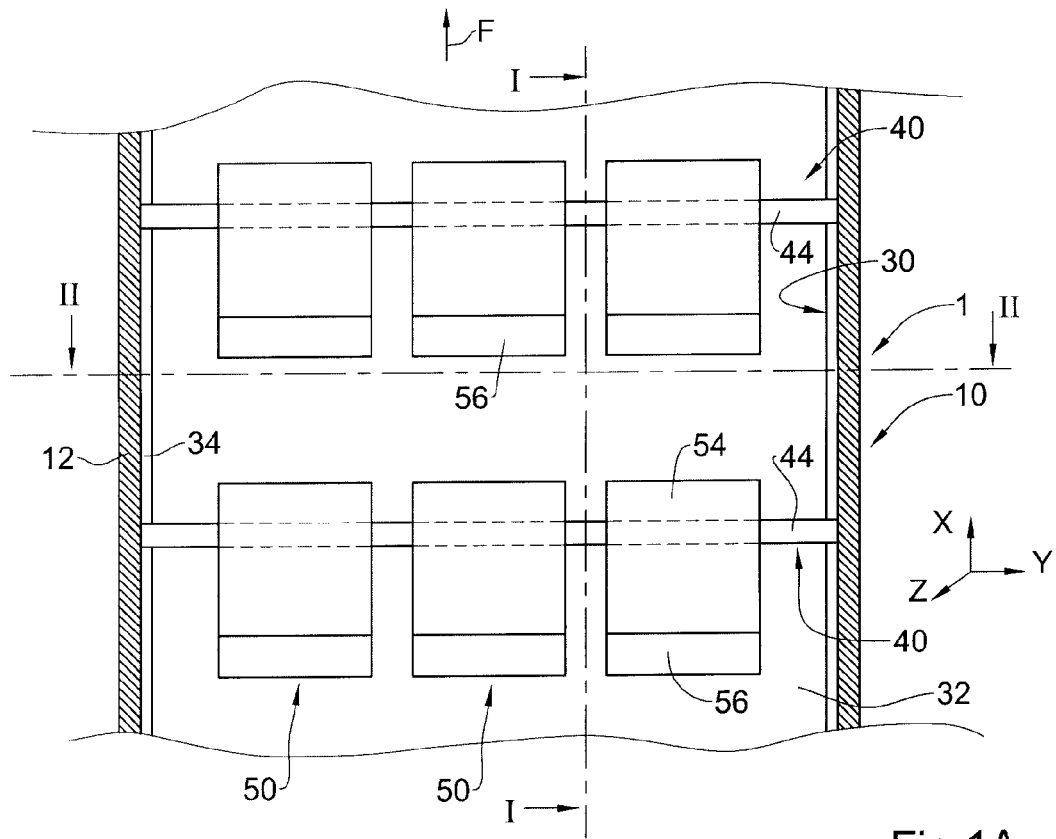
FIG. 1A is a schematic top view of a vehicle cabin according to one embodiment of the present invention.
Figure 1B:
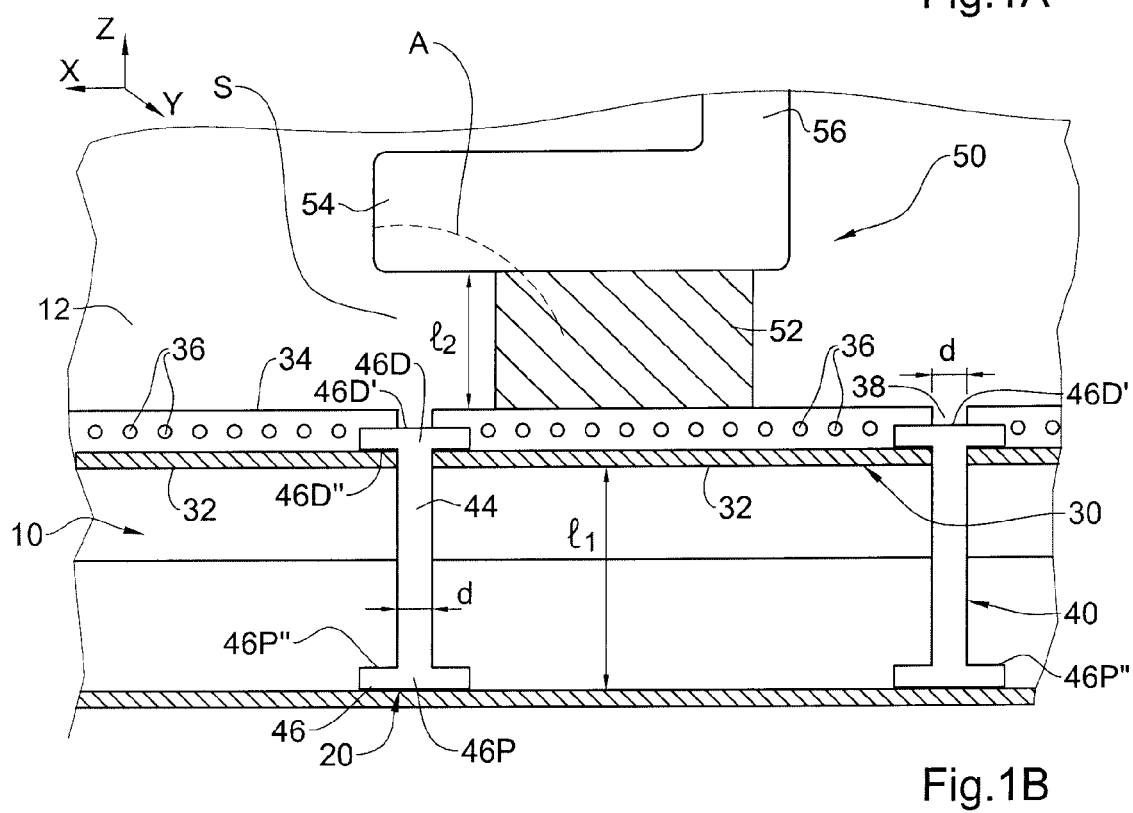
FIG. 1B is a schematic cross-sectional view of the cabin shown in FIG. 1A taken along a plane represented by line I-I in FIG. 1A, the plane being parallel to side walls of the cabin.
Figure 1C:
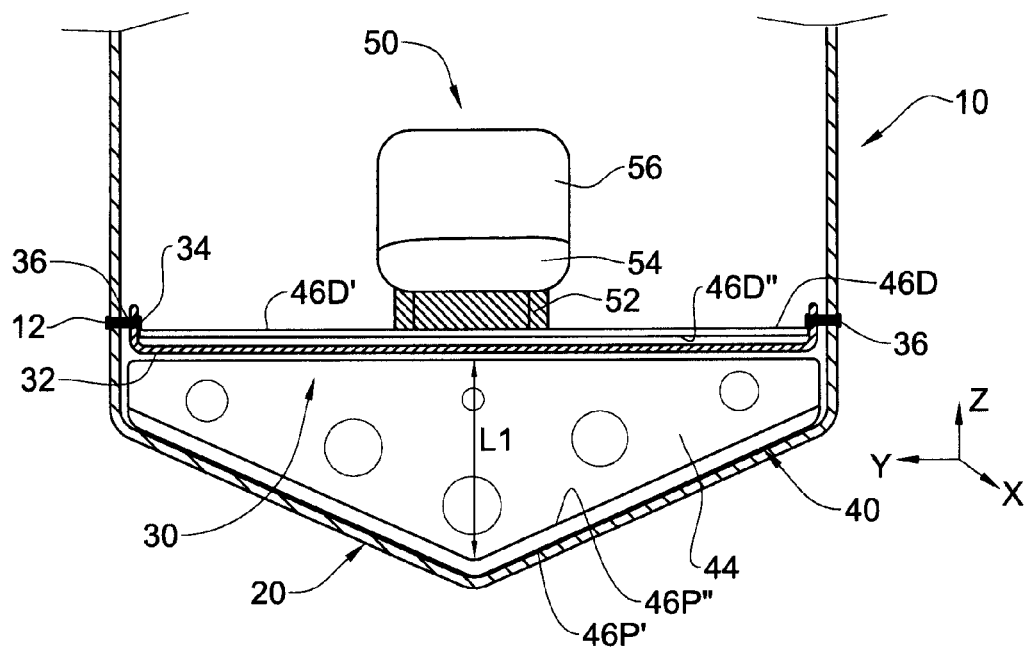
FIG. 1C is a schematic cross-sectional view of the cabin shown in FIG. 1A taken along a plane represented by line II-II in FIG. 1A, the plane being perpendicular to the side walls of the cabin.

With reference to FIGS. 1A to 1C, there is shown a reinforced cabin generally designated 1, of a vehicle, e.g. a military or other vehicle (not shown), comprising a hull 10 with side walls 12 and floor 30 constituting the floor of the vehicle 1, a belly 20, a set of resistance members 40 and several rows of seats 50. The cabin 1 has a length measured along a longitudinal direction X parallel to the side walls 12 and to the floor 30, a width measured along a transverse direction Y between the side walls 12, and a height measured in vertical direction Z perpendicular to the floor 30.

The belly 20 is integrally formed with the side walls 12 of the hull 10, and extends below the floor 30 along the entire length of the cabin in the X direction. It should be noted that the belly 20 does not have to be integrally formed with the side walls 12, and may alternatively be attached thereto, erg. by bolting. The belly 20 has a V-shaped design when viewed along the X direction.

As seen in FIG. 1A, the floor 30 is made of a plurality of planar floor panels 32, and as seen in FIG. 1C each floor panel 32 extends between the side walls 12 of the hull 10, and has rims 34 extending in the vertical direction Z. The rims 34 of the floor panels 32 are affixed to the side walls 12 of the hull 10 so as to ensure that the floor 30 is suspended a predetermined distance L1 above the belly 20, and these may be the only areas at which the panels 32 are attached to the hull 10. Attachment between the rims 34 and side walls 12 of the hull 10 may be performed by bolts 36.

With respect to the distance L1 previously mentioned, it should be understood that it should refer to the greatest vertically measured distance (i.e. along the Z axis) between the floor 30 and the belly 20.

It should be noted that the floor panels 32 should preferably be made of a material preventing sagging deformation of the panels 32 when loads are applied perpendicularly thereto, for example, a load applied by a person standing on the panel or a heavy load being placed thereon.

As seen in FIG. 1B, the floor panels 32 are arranged adjacent one another with a gap 38 between each two floor panels 32, extending between the side walls 12 of the hull 10 along the Y direction.

Figure 3:
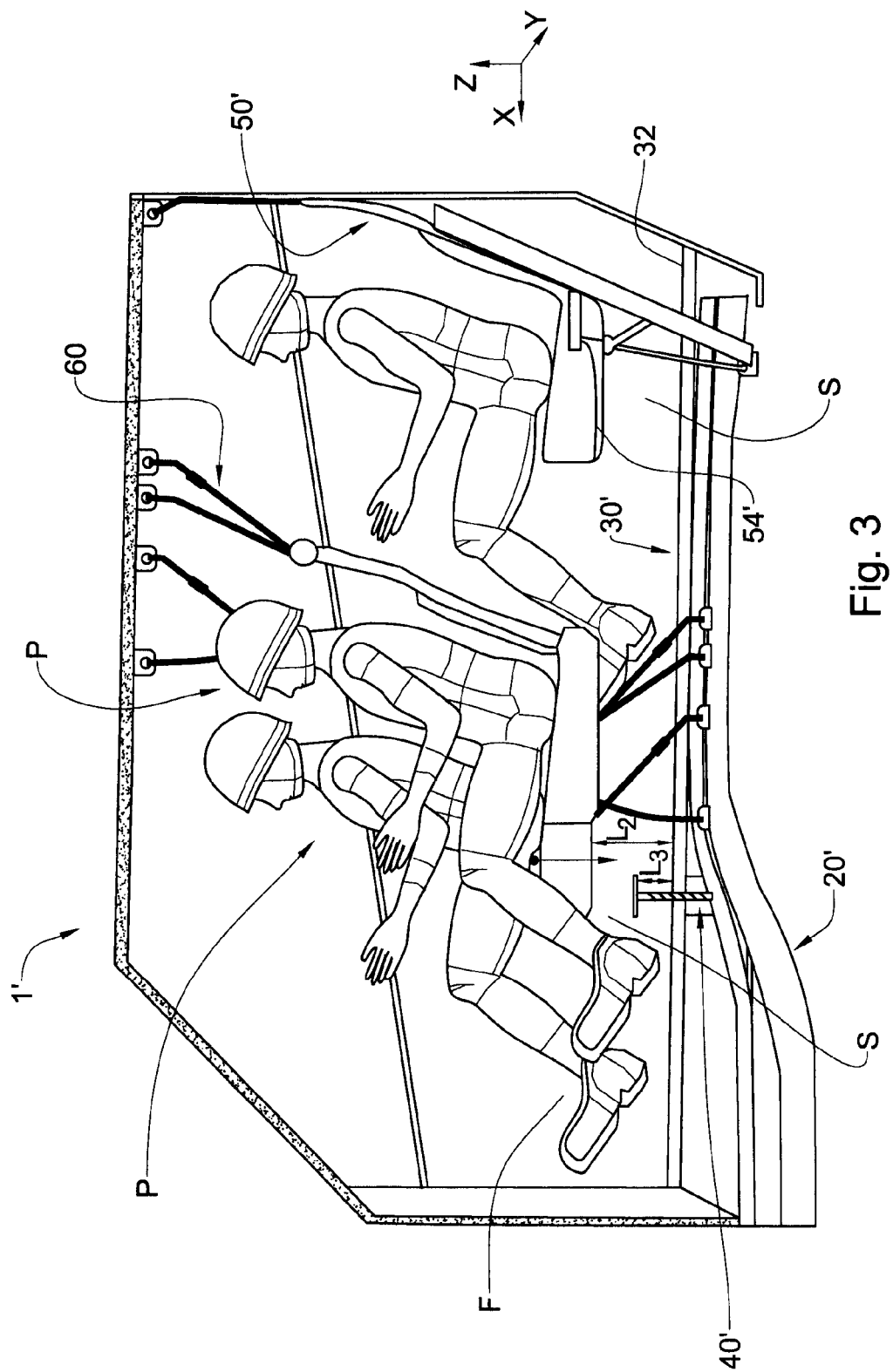
FIG. 3 is a schematic side view of a vehicle cabin according to another embodiment of the present invention, when a belly thereof is deformed under a force of a threat.

As seen in FIG. 1A, the seats 50 are arranged such that passengers when seated thereon, are facing along the direction X, e.g. in the direction of the front of the vehicle as denoted by arrow F (see also FIG. 3)

As best seen in FIG. 1B, each seat 50 comprises a seat portion 54 elevated above the floor 30 by a support 52 having a dimension in the longitudinal direction X, which is smaller than the corresponding dimension of the seat portion 54. There is thus provided a free space S between the seat portion 54 and the floor 30.

Each of the resistance members 40 is in the form of an I-shaped beam having a central, reinforcement portion 44 and proximal and distal attachment portions 46P, 46D, respectively, each having a respective outer surface 46P', 46D' and inner surface 46P'', 46D''.

The shape of the central portion 44 of each resistance member 40, when seen in the direction X, corresponds to that of the belly 20. Thus, for example, as shown in FIG. 1C, the central portion 44 of the resistance member 40 (only one being seen) has a triangular shape fully corresponding to the V shape of the belly 20. However, the correspondence between the shape of the central portion 44 of the resistance member 40 and the belly 20 does not have to be complete. Thus, in the illustrated example of the V-shaped belly 20, the central portion 44 may also be of a trapeze like shape, i.e. not follow the shape of the belly 20 throughout the entire height thereof.

As seen in FIG. 1B, the proximal and distal end portions of each resistance member 40 have an extension along the direction Y, which is greater than that of the gap 38 and which corresponds to the extension of the space S along the same direction, and the central portion 44 of each resistance member 40 has an extension along the direction Y, which is smaller than that of the gap 38.

With further seen in FIG. 1B, the proximal portion 46P of each resistance member 40 is fixedly attached to the belly 20 along its outer surface 46D', 46P' (for example, by welding or bolting), while the distal portion 46D of the resistance member 40 is positioned above two adjacent floor panels 32 of the floor 30, with its inner surface 46P''' flush thereagainst, yet not attached thereto, being located directly under the space S which itself is under the seat portion 54 of the passenger seat 50.

The above arrangement allows the resistance members 40 to slidingly move upwards, when a force is applied to its proximal portion 46P along the vertical direction Z.

Figures 2A, 2B:
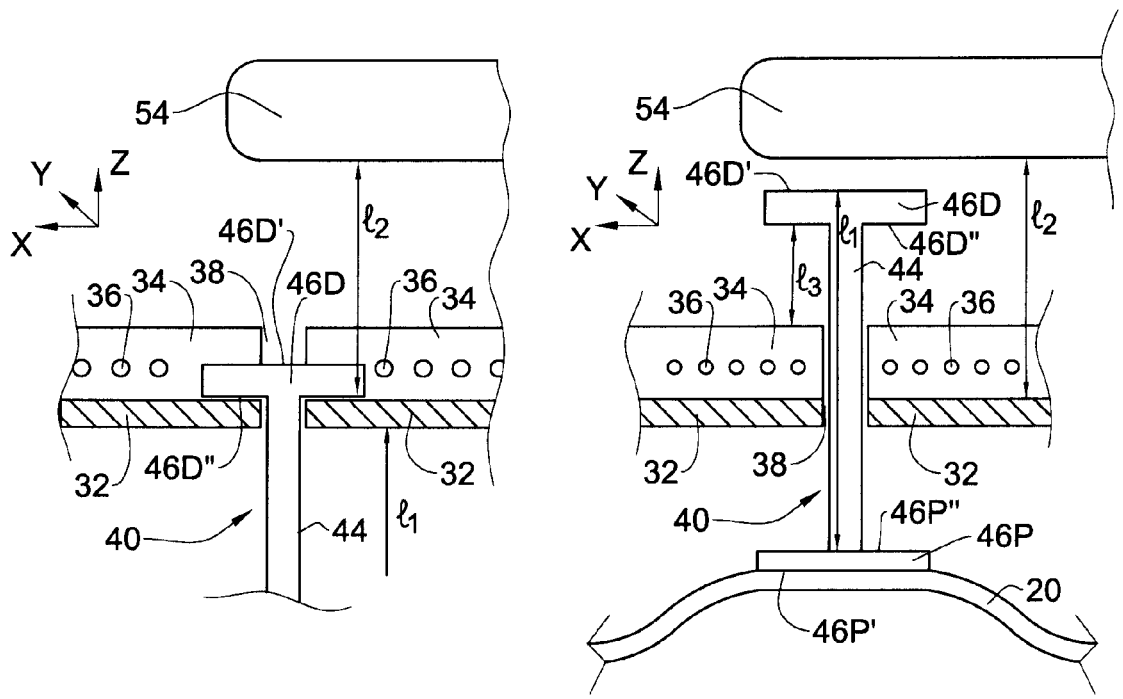
FIG. 2A is a schematic enlarged view of detail A shown in FIG. 1B.
FIG. 2B is a schematic view of detail A shown in FIG. 2A, when a belly of the cabin is deformed under a force of a threat.

Turning now to FIGS. 2A and 2B, it is observed that in a normal position, the vertical distance (measured along the X axis) between the lowermost point of the belly 20 and the floor 30 is L1 and the distance between the floor 30 and the seat portion 54 is L2 (determined by the height of the support 52).

With particular reference to FIGS. 2B, the cabin 1 is shown with the belly 20 thereof being upwardly deformed (along the Z axis), for example, under the force of an explosion of a threat. It is observed that while belly 20 is deformed upwards such that it almost reaches the floor panels 32, since the resistance members 40 slide between the floor panels 32, the panels 32 remain generally planar such that the passenger's feet F may remain rested thereon in a position similar to that before the explosion.

Since the proximal end 46P of the resistance member 40 is fixedly attached to the belly 20, deformation of the latter entails upward displacement of the former, causing the displacement of the distal end 46D of the beam into a position in which it is elevated above the floor panels 32. Since the distal end 46D of the resistance member 40 is not attached to the floor panels 32, the upward displacement of the resistance member 40, and consequently the force applied to the belly 20, does not affect the floor panels 32. In addition, since the space S underneath the seat portion 54 is usually not occupied by passenger limbs, the limbs are not in danger of impact of the resistance member 40 due to the upward displacement thereof.

It is also observed that despite the upward displacement of the resistance member 40, the distal end 46D of the resistance member 40 does not reach the bottom side of the seat portion 54 of the seat 50, and does not impact the passengers P seated on the seat 50.

The belly 20, reinforced by the resistance members 40, is adapted to withstand a certain maximal force of a threat, the term 'withstand' meaning that the deformation of the belly 20 toward the floor panels 32 under the application of such a force will not exceed its predetermined maximal allowable value L3. It should be noted that, would the cabin 10 have no resistance members 40, the value of its deformation L4 of the belly 20 would be essentially greater than the value L3.

The cabin is designed such that the axial extension L1 between the belly 20 and the floor 30 exceeds the maximal allowable deformation L3, whereby under such maximal deformation, the belly 20 does not come in contact with the floor 30. The cabin is also designed such that the maximal allowable deformation L3 of the belly 20 does not exceed the distance L2 between the floor panels 32 and the seat portion 54, thereby preventing impact by the distal end 46D of the resistance member 40 on the bottom side of the seat portion 54.

Turning now to FIG. 3, another embodiment of a reinforced cabin is shown, generally designated 1', and comprising a belly 20', a floating floor 30', resistance members 40' and seats 50'. The difference between the cabin 1' and the cabin previously described lies in that the seats 50' are suspended seats, i.e. the seats 50 are not positioned on a support 52 as in the previous example, but rather are suspended above the floating floor 30 by a suspension arrangement 60. In the present case, the distance L2 is determined by the suspension arrangement rather than by the support 52 of the reinforced cabin 1 previously disclosed.

Those skilled in the art to which this invention pertains will readily appreciate that numerous changes, variations, and modification can be made without departing from the scope of the invention, mutatis mutandis.

The invention claimed is:

1. A reinforced cabin for a vehicle adapted to protect the interior of said cabin against a threat of a certain maximal force, said vehicle cabin being defined by at least a vehicle belly and side walls extending upwardly therefrom, and comprising:
    a vehicle floor extending between said side walls and spaced a distance L1 from the vehicle belly;
    at least one passenger seat comprising a seat portion parallel to the floor, and
    positioned such that there extends a space of a distance L2 between said seat portion and said vehicle floor;
    at least one resistance member having a proximal end fixedly attached to said belly and a distal end adjacent said vehicle floor, and located at least partially underneath said seat portion;
    said belly being adapted to undergo, under said certain maximal force, when applied, a maximal upward deformation towards said floor of a distance L3, and the vehicle floor is formed with at least one opening adapted to slidingly receive therethrough said resistance member in order to allow the distal end thereof to assume a position elevated a distance corresponding to the distance L3 above said vehicle floor, the arrangement being such that $L2 \geq L3$, $L1 \geq L3$ and $L3 < L4$, wherein L4 is the maximal upward deformation which said belly would undergo towards said floor under said maximal force, in the absence of said at least one resistance member.

2. A reinforced cabin according to claim 1, wherein said resistance member is in the form of a pillar, extending upwardly between the belly and the vehicle floor.

3. A reinforced cabin according to claim 1, wherein said resistance member is in the form of a beam having an axial extension between the belly and the vehicle floor and a longitudinal extension in a direction perpendicular to the axial direction.

4. A reinforced cabin according to claim 3, wherein said cabin comprises one or more seats arranged in one or more rows.

5. A reinforced cabin according to claim 4, wherein said row(s) extend along the width of the cabin, between its sidewalls such that passengers seated on the seats are facing either the front of the vehicle or the rear of the vehicle.

6. A reinforced cabin according to claim 5, wherein the longitudinal extension of said resistance member(s) is widthwise, parallel to the row(s) of seats.

7. A reinforced cabin according to claim 6, wherein the shape of the resistance member corresponds to the shape of the belly of the vehicle.

8. A reinforced cabin according to claim 4, wherein said row(s) extend along the length of the cabin between a front end to a rear end thereof parallel to the side walls of the cabin such that the passengers seated on the seats are facing one of the side walls.

9. A reinforced cabin according to claim 8, wherein the longitudinal extension of the resistance member(s) is lengthwise, parallel to the rows of the seats.

10. A reinforced cabin according to claim 1, wherein said belly has, in its cross-section taken along a plane perpendicular to both the side walls and the vehicle floor, at least one of the following shapes: straight, trapeze and V shaped.

11. A reinforced cabin according to claim 10, wherein the shape of the resistance member corresponds to the shape of the belly of the vehicle.

12. A reinforced cabin according to claim 1, wherein the seat portion is suspended above the vehicle floor using a suspension mechanism.

13. A reinforced cabin according to claim 1, wherein the seat portion of the at least one seat is spaced from the vehicle floor by a support member attached to the bottom surface of the seat portion.

\* \* \* \* \*